United States Patent
Maniwa

(10) Patent No.: US 8,400,526 B2
(45) Date of Patent: Mar. 19, 2013

(54) IMAGE SENSING APPARATUS AND CONTROL METHOD THEREOF

(75) Inventor: Junichi Maniwa, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 12/691,568

(22) Filed: Jan. 21, 2010

(65) Prior Publication Data

US 2010/0188533 A1    Jul. 29, 2010

(30) Foreign Application Priority Data

Jan. 26, 2009    (JP) ................. 2009-014584

(51) Int. Cl.
*H04N 5/76* (2006.01)
(52) U.S. Cl. ............. 348/231.6; 348/239; 348/240.3
(58) Field of Classification Search ............ 348/239, 348/231.3, 231, 6, 240.3, 222.1
See application file for complete search history.

(56) References Cited

U.S. PATENT DOCUMENTS

| | | | |
|---|---|---|---|
| 4,731,629 A | | 3/1988 | Aoshima et al. |
| 5,305,049 A | * | 4/1994 | Miyazaki et al. ............... 396/63 |
| 2005/0212955 A1 | * | 9/2005 | Craig et al. ................ 348/362 |

FOREIGN PATENT DOCUMENTS

| | | |
|---|---|---|
| JP | 03-236022 A | 10/1991 |
| JP | 07-23949 | 3/1995 |
| JP | 2003-283903 A | 10/2003 |
| JP | 2005-033502 A | 2/2005 |
| JP | 2007-096455 A | 4/2007 |
| JP | 2007-221723 | 8/2007 |

OTHER PUBLICATIONS

The above references were cited in a Oct. 26, 2012 Japanese Office Action, which is enclosed without English Translation, that issued in Japanese Patent Application No. 2009-014584.

* cited by examiner

*Primary Examiner* — Sinh Tran
*Assistant Examiner* — Paul Berardesca
(74) *Attorney, Agent, or Firm* — Cowan, Liebowitz & Latman, P.C.

(57) ABSTRACT

An image sensing apparatus has an image sensing unit that outputs an image signal in accordance with incident light through an optical system including a zoom lens. The apparatus performs photographing by exposing the image sensing unit while driving the zoom lens, and stores attached information relating to photography at a predetermined timing after driving of the zoom lens has started during photographing. After the end of exposure of the image sensing unit, an image signal output from the image sensing unit is recorded in association with the stored attached information.

21 Claims, 5 Drawing Sheets

IMAGE SENSING APPARATUS AND CONTROL METHOD THEREOF

BACKGROUND OF THE INVENTION

1. Field of the Invention

The present invention relates to an image sensing apparatus and a control method thereof, and more particularly to an image sensing apparatus that has a scaling mechanism capable of zoom driving during exposure and a control method thereof.

2. Description of the Related Art

Zoom photography during exposure is already widely known as a photography technique for obtaining a special effect in which the periphery of an image appears to flow radially. However, performing a zoom operation during exposure requires an extremely high level of technique and also requires skill.

Because of this situation, as described in Japanese Patent Publication No. 07-23949, technology exists that shifts the zoom using electric power in a synchronized manner with respect to the exposure timing.

Conventionally, various information other than image data is recorded as attached information in an image file, and the attached information that is recorded is extensively utilized when processing the image data. For example, it is possible to record various information such as the model of a camera, photographing date and time, thumbnail information, and the like in an image file that conforms to Exif (Exchangeable Image Format). Japanese Patent Laid-Open No. 2007-221723 discloses technology relating to a recording method and a utilization method thereof.

Conventionally, when recording information relating to a lens barrel such as a focal length or an f-number as Exif information, a focal length or f-number that is determined by focus adjustment control or exposure control at a time of photographing preparation is recorded as the Exif information. However, in the case of zoom photography during exposure, since the focal length and f-number fluctuate due to zoom driving during exposure, there is the problem that an undesirable situation occurs in which there is a difference in the focal length and f-number between the image that is actually photographed and the relevant Exif information.

SUMMARY OF THE INVENTION

The present invention has been made in consideration of the above situation, and is to record attached information that has no difference with respect to image data obtained by photographing in zoom photography during exposure.

According to the present invention, provided is an image sensing apparatus, comprising: an image sensing unit that outputs an image signal in accordance with incident light through an optical system including a zoom lens; an exposure control unit that controls an exposure of the image sensing unit; a zoom photography unit that controls so as to expose the image sensing unit by means of the exposure control unit while driving the zoom lens; a storage unit that stores attached information relating to photographing at a predetermined timing after driving of the zoom lens by the zoom photography unit is started; and a recoding unit that records an image signal output from the image sensing unit after ending exposure of the image sensing unit in association with the attached information stored in the storage unit.

According to the present invention, provided is a control method of an image sensing apparatus comprising an image sensing unit that outputs an image signal in accordance with incident light through an optical system including a zoom lens, comprising: a photographing step of performing photography by exposing the image sensing unit while driving the zoom lens; a storing step of storing attached information relating to photographing at a predetermined timing after driving of the zoom lens is started in the photographing step; and a recording step of recording an image signal output from the image sensing unit after ending exposure of the image sensing unit in association with the attached information that is stored.

Further features of the present invention will become apparent from the following description of exemplary embodiments (with reference to the attached drawings).

DESCRIPTION OF THE EMBODIMENTS

Figure 1:
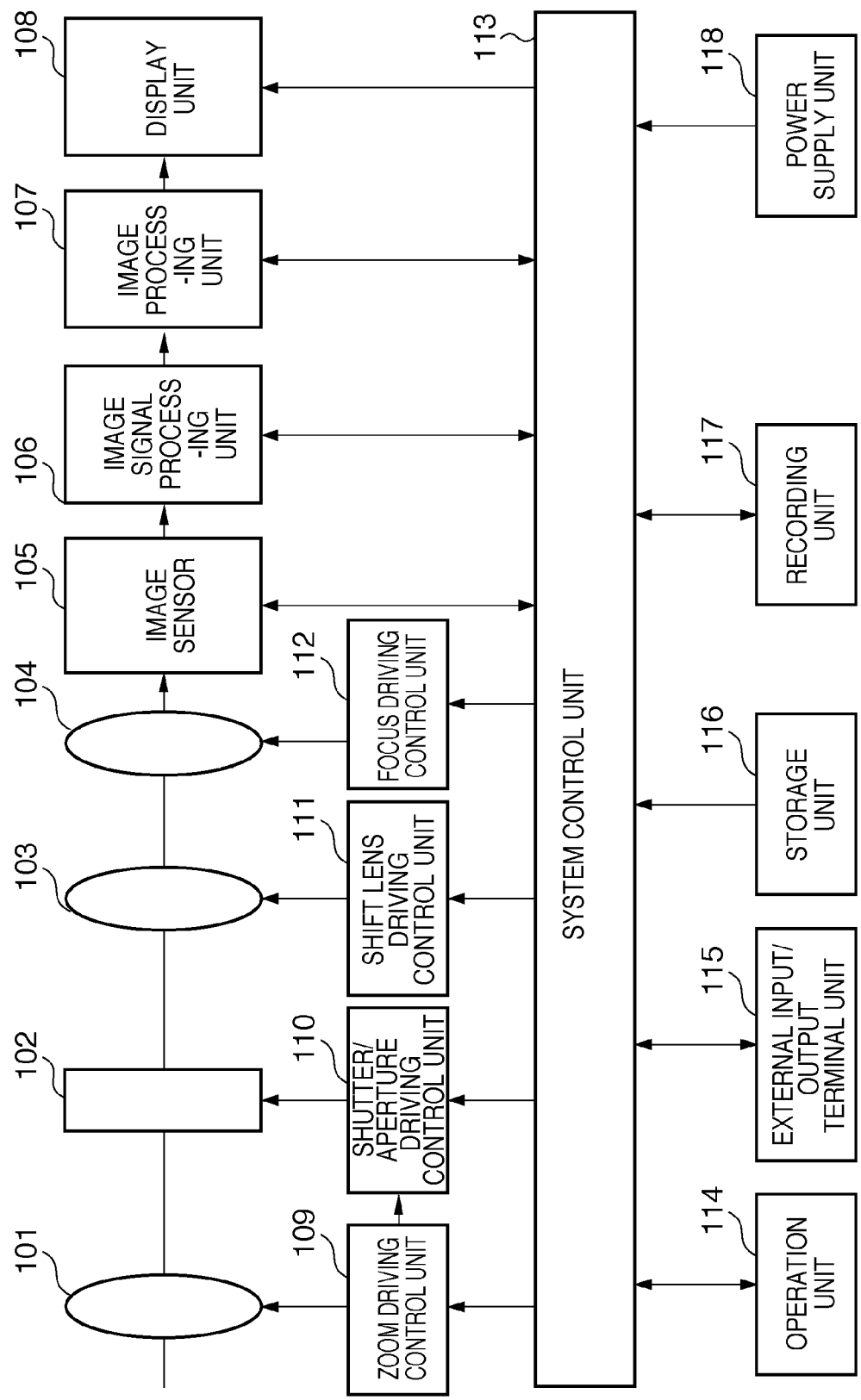
FIG. 1 is a block diagram that shows a brief configuration of an image sensing apparatus according to an embodiment of the present invention.

Preferred embodiments of the present invention will be described in detail in accordance with the accompanying drawings.

Reference numeral 101 denotes a first lens group that is a zoom lens that performs scaling and is capable of changing its position in an optical axis direction (hereinafter, referred to as "zoom lens"). Reference numeral 109 denotes a zoom driving control unit that controls driving of the zoom lens 101.

Reference numeral 102 denotes a shutter/aperture unit. Reference numeral 110 denotes a shutter/aperture driving control unit that controls driving of the shutter/aperture unit 102.

Reference numeral 103 denotes a second lens group that is a shift lens as a camera shake correction optical system capable of changing its position on a plane that is approximately perpendicular to the optical axis (hereinafter, referred to as "shift lens"). Reference numeral 111 denotes a shift lens driving control unit that controls driving of the shift lens 103.

Reference numeral 104 denotes a third lens group that is a focus lens that adjusts a focus and is capable of changing its position in the optical axis direction (hereinafter, referred to as "focus lens"). Reference numeral 112 denotes a focus driving control unit that controls driving of the focus lens 104.

Reference numeral 105 denotes an image sensor that converts an incident optical image that passes through each lens group and the shutter/aperture unit 102 into an electrical signal. Reference numeral 106 denotes an image signal processing unit that subjects an electrical signal output from the image sensor 105 to conversion processing to obtain an image signal. Reference numeral 107 denotes an image processing unit that processes an image signal output from the image signal processing unit 106 in accordance with an intended purpose, and outputs processed image data. Reference numeral 108 denotes a display unit that displays an image as needed based on image data output from the image processing unit 107.

Reference numeral 113 denotes a system control unit that controls the entire system. Reference numeral 114 denotes an operation unit for operating the system. The operation unit 114 has a shutter release button configured such that a first switch (hereunder referred to as "SW1") and a second switch (hereunder referred to as "SW2") are turned on in sequence in accordance with an amount by which the shutter release button is pushed down. When the shutter release button is pushed down approximately halfway the SW1 turns on, and when the shutter release button is pushed down fully the SW2 turns on.

Reference numeral 115 denotes an external input/output terminal unit that inputs/outputs communication signals and image data from and to the outside. Reference numeral 116 denotes a storage unit that stores various data such as image information. Reference numeral 117 denotes a recording unit that records image data and attached information and the like on a recording medium. Reference numeral 118 denotes a power supply unit that supplies electric power to each part of the image sensing apparatus in accordance with an intended use.

Next, an outline of operations of the image sensing apparatus that has the above described configuration at a time of general photographing will be described.

When the SW1 is turned on by depressing the shutter release button of the operation unit 114, the system control unit 113 adjusts the focus by causing the focus driving control unit 112 to drive the focus lens 104 based on an automatic focus function (AF). Further, the system control unit 113 sets an appropriate light exposure by causing the shutter/aperture driving control unit 110 to drive the shutter/aperture unit 102 based on an automatic exposure function (AE).

Further, when the SW2 is turned on, the system control unit 113 converts an electrical signal obtained from an optical image formed on the image sensor 105 into an image signal at the image signal processing unit 106. After the converted image signal has further undergone image processing at the image processing unit 107, the system control unit 113 stores the resulting data in the storage unit 116 and also records the image data on a recording medium at the recording unit 117. At this time, the system control unit 113 records lens barrel information including a focal length and an f-number, and photographing information and the like as attached information in Exif format in association with the image data.

Further, when there is a scaling instruction from the operation unit 114, the system control unit 113 drives the zoom lens 101 by means of the zoom driving control unit 109 to move the zoom lens 101 to the instructed zoom position. In addition, the system control unit 113 adjusts the focus by driving the focus lens 104 by means of the focus driving control unit 112 based on image data that has been output from the image sensor 105 and processed by the image signal processing unit 106 and the image processing unit 107.

The system control unit 113 also performs a camera shake correction operation by driving the shift lens 103 by means of the shift lens driving control unit 111.

If the operation unit 114 has not been operated for a certain period of time, the system control unit 113 cuts off the power supply of the display unit 108 to save power.

Figure 2:
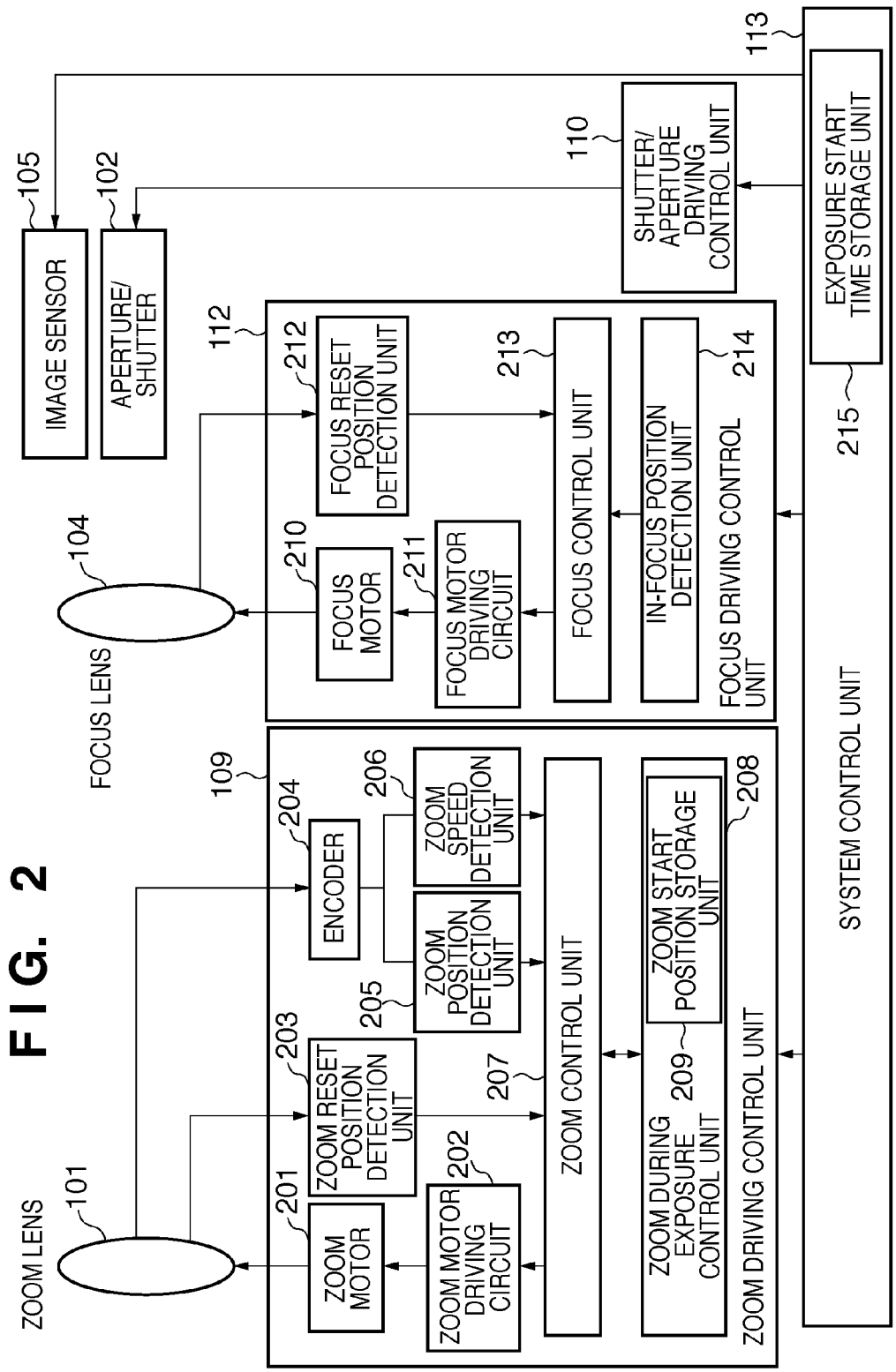
FIG. 2 is a block diagram that shows the detailed configuration of a zoom driving control unit 109 and a focus driving control unit 112 shown in FIG. 1.

FIG. 2 is a block diagram that illustrates the detailed configuration of the zoom driving control unit 109 and the focus driving control unit 112 shown in FIG. 1.

Reference numeral 201 denotes a zoom motor that comprises a DC motor or the like that performs a zoom operation by moving the zoom lens 101 in the optical axis direction. Reference numeral 202 denotes a zoom motor driving circuit that is an analog circuit that drives the zoom motor 201. Reference numeral 203 denotes a zoom reset position detection unit that detects a reset position of the zoom lens 101.

Reference numeral 204 denotes an encoder that converts a position of the zoom lens 101 into pulse information. Reference numeral 205 denotes a zoom position detection unit that detects an absolute position of the zoom lens 101 by means of pulse information obtained from the encoder 204. Reference numeral 206 denotes a zoom speed detection unit that detects a moving speed of the zoom lens 101 by means of pulse information obtained from the encoder 204.

Reference numeral 207 denotes a zoom control unit that controls a zoom driving amount in accordance with detection results of the zoom position detection unit 205 and the zoom speed detection unit 206, and moves the zoom lens 101 by driving the zoom motor 201 via the zoom motor driving circuit 202 based on the zoom driving amount. Further, the zoom control unit 207 determines a reference position of the zoom lens 101 in accordance with a detection result of the zoom reset position detection unit 203.

Reference numeral 208 denotes a zoom during exposure control unit that operates in conjunction with the zoom control unit 207 and the shutter/aperture driving control unit 110 to perform zoom driving control during exposure. Reference numeral 209 denotes a zoom start position storage unit which is a part of the zoom during exposure control unit 208. The zoom start position storage unit 209 stores a zoom start position at a time of zoom photography during exposure.

Reference numeral 210 denotes a focus motor that comprises a stepping motor or the like. The focus motor 210 performs focus adjustment control by moving the focus lens 104 in the optical axis direction. Reference numeral 211 denotes a focus motor driving circuit that is an analog circuit that drives the focus motor 210. Reference numeral 212 denotes a focus reset position detection unit that detects a reset position of the focus lens 104.

Reference numeral 213 denotes a focus control unit that controls a focus driving amount. Reference numeral 214 denotes an in-focus position detection unit that detects an in-focus position of a subject from an image obtained from the image sensor 105 while moving the focus lens 104.

Reference numeral 215 denotes an exposure start time storage unit that is a part of the system control unit 113. The exposure start time storage unit 215 stores a time from the start of zooming until the start of exposure when performing zoom photography during exposure.

Next, zoom photography during exposure processing will be described using FIG. 3 to FIG. 6.

Figure 3:
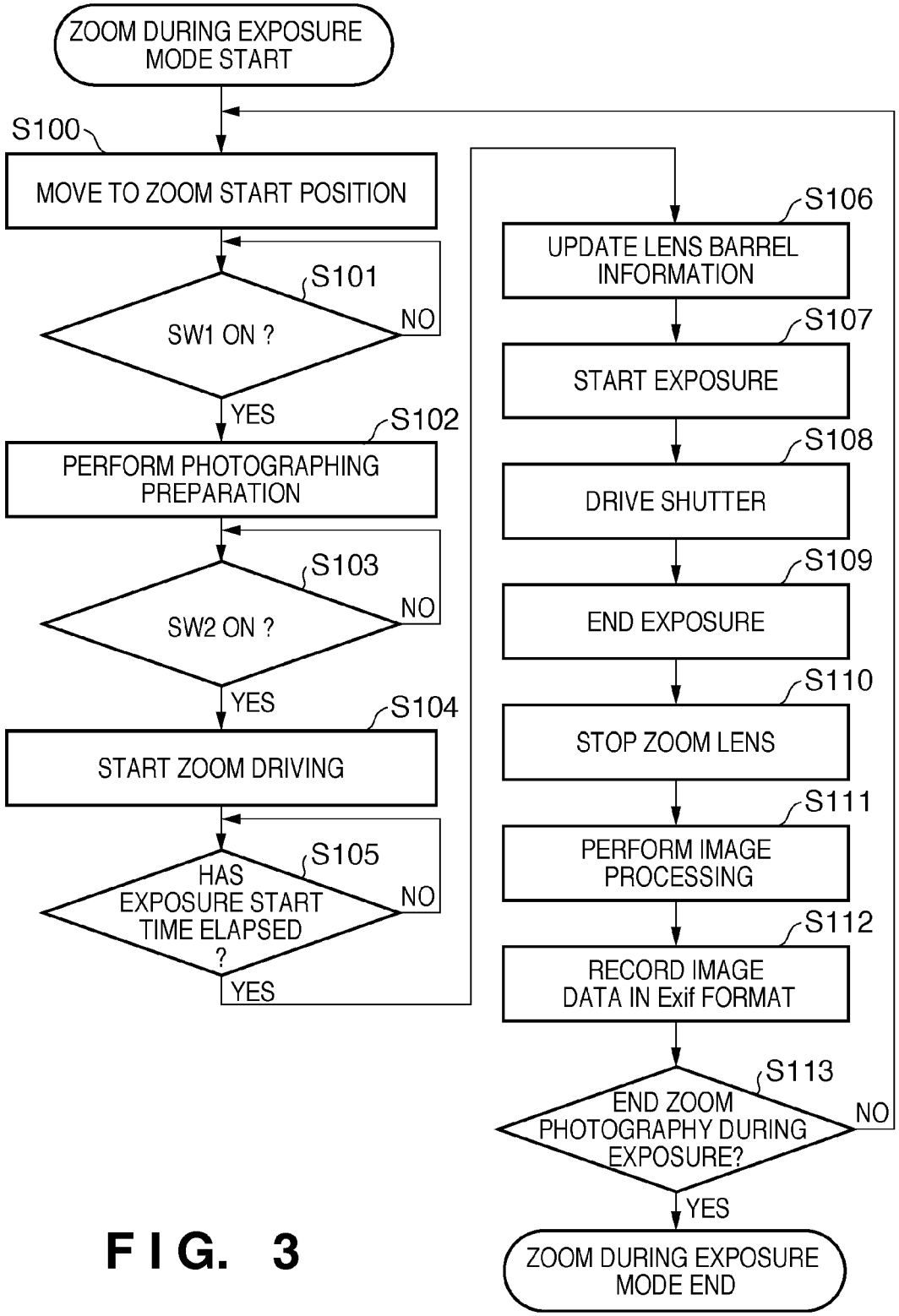
FIG. 3 is a flowchart that illustrates zoom photography during exposure processing according to the embodiment of the present invention.
Figure 4:
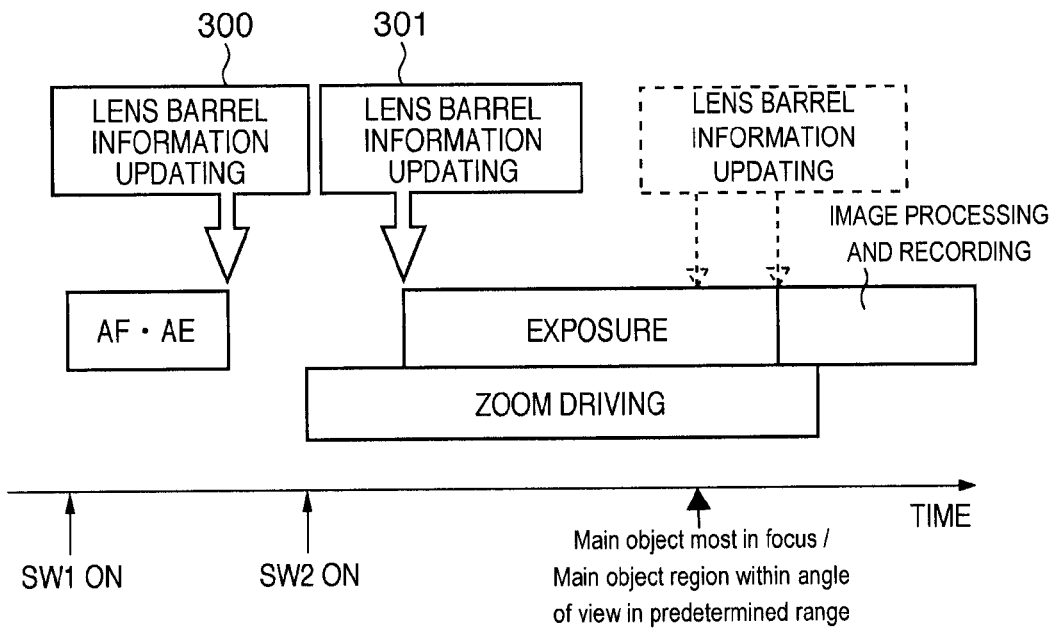
FIG. 4 is a timing chart of zoom photography during exposure processing according to the embodiment of the present invention.

FIG. 3 is a flowchart that describes the procedures of zoom photography during exposure processing according to the present embodiment. FIG. 4 is a view that illustrates the timing of photographing in zoom photography during exposure. Zoom photography during exposure is a photographing mode for obtaining a special effect whereby an image is caused to flow radially from the center of the image to the periphery thereof by continuously changing the focal length during exposure.

When starting zoom photography during exposure, the system control unit 113 moves the zoom lens 101 to a predetermined zoom start position that is stored in the zoom start position storage unit 209 (step S100). Next, when the shutter release button is depressed and the SW1 is turned on (Yes in step S101), the system control unit 113 performs photographing preparation processing (step S102). In the photographing preparation processing, the system control unit 113 moves the focus lens 104 to a position at which the lens is focused on the subject as AF processing, and also decides the light exposure so as to achieve the appropriate exposure as AE processing. The light exposure is determined by the aperture value and shutter speed (exposure time). In the case of zoom photography during exposure, since exposure is performed during driving of the zoom lens 101, it is considered to be suitable to set the shutter speed slow. Therefore, in this case, the exposure time is set as long as possible, and the aperture value is decided so as to obtain the appropriate exposure. Here, of the various information included in the lens barrel information, exposure information that includes the exposure time and aperture value is updated to information that is determined by this photographing preparation processing (300 in FIG. 4).

Subsequently, when the shutter release button is operated to turn the SW2 on (Yes in step S103), the system control unit 113 starts driving of the zoom lens 101 (step S104). Driving of the zoom lens 101 continues until the zoom lens 101 reaches a position at which an image effect of zoom during exposure can be suitably obtained. Next, upon elapse of the exposure start time stored in the exposure start time storage unit 215 from the start of driving of the zoom lens 101 (Yes in step S105), the operation proceeds to step S106. In step S106, the system control unit 113 updates an f-number, a minimum aperture value of the lens, and a focal length (focal length information) and the like in accordance with the current position of the zoom lens 101 among the lens barrel information (301 in FIG. 4), and thereafter starts exposure in step S107.

Next, the system control unit 113 drives the shutter/aperture unit 102 to block light to the image sensor 105 so as to obtain the exposure time determined in the photographing preparation processing in step S102 (step S108), and ends accumulation of a charge to end the exposure (step S109). When exposure ends, the system control unit 113 stops the zoom lens 101 (step S110). The system control unit 113 reads out the charge accumulated in the image sensor 105 and subjects the charge to A/D conversion, and thereafter performs image processing that generates image data by carrying out various kinds of image processing (step S111).

Next, the system control unit 113 encodes image data and records the encoded image data on a recording medium. According to the present embodiment, it is assumed that image data is recorded in a file format that conforms to Exif. In this case, the system control unit 113 includes attached information such as the photographing date and time, the model ID of the camera, and the lens barrel information in a tag that is defined by Exif and records that information (step S112).

Figure 5:
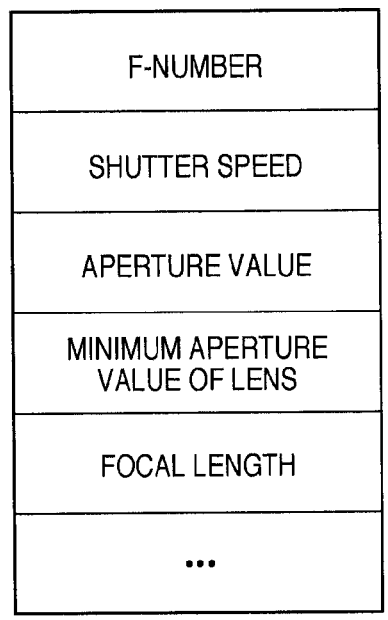
FIG. 5 is a view that illustrates the configuration of a tag relating to lens barrel information of Exif according to the embodiment of the present invention.

FIG. 5 illustrates the structure of a tag relating to the lens barrel information according to Exif in this case. As shown in FIG. 5, a tag relating to the lens barrel information according to the present embodiment comprises exposure information such as the f-number, shutter speed, and aperture value, lens information such as the minimum aperture value of the lens, and focal length information and the like. For zoom photography during exposure, lens barrel information that is updated at the start of exposure is recorded in a lens barrel information tag of Exif. As a result, even at the time of zoom photography during exposure, attached information that does not differ with respect to the recorded image data can be recorded as a lens barrel information tag of Exif.

Thereby, the series of a photographing sequence for zoom photography during exposure is completed. When continuing to perform zoom photography during exposure (No in step S113), the system control unit 113 returns to step S100 to move the zoom lens 101 to the predetermined zoom start position, and waits for the next photographing instruction.

When the zoom photography during exposure is to be ended (Yes in step S113), the system control unit 113 ends the processing.

According to the above processing, even at the time of zoom photography during exposure it is possible to record attached information that does not differ with respect to the recorded image data as a lens barrel information tag of Exif.

Although a case is described above of recording lens barrel information such as the f-number, the minimum aperture value of the lens, and the focal length that is updated when starting exposure of the image sensor 105, the timing for updating the lens barrel information of the present invention is not limited to the time when starting exposure. It is sufficient to update the information during the period between the start of exposure and the end of exposure of the image sensor 105. For example, the update timing may be when exposure ends, when a main object is most in focus during exposure, when a region of the main object within a photographing angle of view is in a range of a predetermined size, or the like.

It is not necessary that a timing at which the lens barrel information is recorded is only a single time. For example, a configuration may be adopted in which lens barrel information is stored a plurality of times during a period from the start of exposure to the end of exposure of the image sensor 105, and lens barrel information of an amount for a plurality of times that is obtained thereby is recorded.

Next, the reason for making the start and end timing of driving the zoom lens 101 different from the start and end timing of exposure of the image sensor 105 during zoom photography during exposure as described above will be described referring to FIG. 6.

Figure 6:
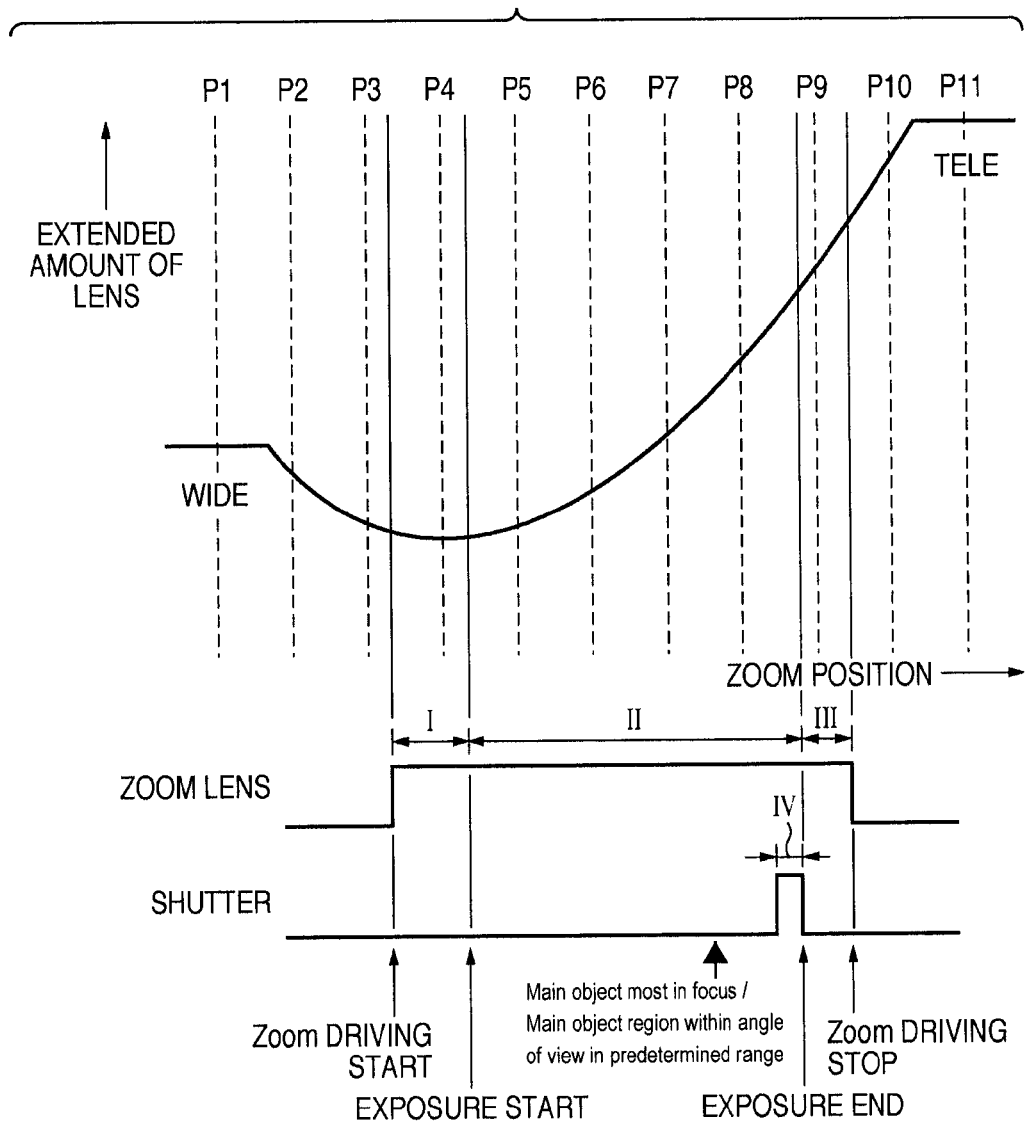
FIG. 6 is a view that explains the start and end timing of driving a zoom lens and the start and end timing of exposure of an image sensor according to the embodiment of the present invention.

In the upper part of FIG. 6, the ordinate represents an extended amount of the zoom lens 101, and the abscissa represents a position of the zoom lens 101 such that the focal length becomes successively longer with P1 taken as the wide angle (wide) end and continuing in the order of P, P3, P4 and so forth as far as P11 that is the telephoto (tele) end. In many lens barrels, the extended amount of the zoom lens 101 shortens temporarily at a position partway along the zoom, as shown in FIG. 6. The zoom position P4 is a position at which the extended amount of the lens is smallest, and hereafter this position is referred to as "zoom inflection point".

In the vicinity of the zoom inflection point P4, backlash of the lens barrel or decentration of the lens is liable to occur due to an increase in the mechanical load, and adverse effects on a photographed image such as changes in the angle of view becoming small locally are also a concern. Consequently, it is not desirable to perform zoom driving that includes the zoom inflection point P4 during exposure.

Further, since it is necessary to actuate the shutter (shutter/aperture unit 102) when ending the exposure for zoom photography during exposure, there is also the problem that a voltage falls below the lower limit of a voltage required for the image sensing apparatus due to the influence of a power supply voltage drop in a case where an inrush current of the zoom lens 101 and shutter driving coincide. Therefore, in the case of zoom photography during exposure it is necessary to perform control so that an inrush current of zoom driving and an inrush current of shutter driving do not coincide.

Upon the start of zoom photography during exposure, the system control unit 113 starts zoom driving. After waiting for the amount of the exposure start time (inrush current supply time I of zoom lens 101) after the start of zoom driving, the system control unit 113 starts exposure. The system control unit 113 supplies a current to the shutter/aperture unit 102 so that an exposure time II equals the exposure time decided in step S102 (shutter current supply time IV), and ends the exposure. After exposure ends, the system control unit 113 performs post-processing such as reading out a charge from the image sensor 105 (processing time after exposure ends III) and stops driving of the zoom lens 101. As a result, it is possible to minimize the impact of a voltage drop in the power supply without the inrush current of zoom driving and the inrush current of shutter driving coinciding even when the exposure time is short. Further, since it is possible to drive the zoom lens 101 in the entire exposure period, it is easy to obtain a zoom during exposure effect even when the exposure time is short.

Further, in order to avoid the zoom inflection point P4, the zoom start position (driving start position) stored in the zoom start position storage unit 209 is taken to be a position decided in the following manner. That is, the zoom start position is taken as a position that is separated by a distance that is shorter than a distance that the zoom lens 101 drives during the inrush current supply time of the zoom lens 101 in an opposite direction to the zoom driving direction with respect to the zoom inflection point P4. At this time, when the exposure start time stored in the exposure start time storage unit 215 is taken as the inrush current supply time of zoom driving, since a zoom position at which exposure is started is past the zoom inflection point P4, it is possible to avoid averse affects on the image quality caused by mechanical factors in the vicinity of the zoom inflection point. Further, when the amount of change in the angle of view in the vicinity of the zoom inflection point P4 is small, the influence of focal point movements during the zoom inrush current supply time may be ignored.

In a case where the amount of change in the angle of view in the vicinity of the zoom inflection point P4 is large, the zoom start position may be taken as a position decided in the following manner. That is, the zoom start position may be a position separated by a distance that is shorter than a distance that the zoom lens 101 drives in a time obtained by adding a time necessary for correcting a focal point of the focus lens 104 to an inrush current supply time of the zoom lens 101 in a direction opposite to the zoom driving direction with respect to the zoom inflection point P4.

In this connection, although in the above description the zoom start position of the zoom lens 101 for zoom photography during exposure is stored in the zoom start position storage unit 209, in a case where the driving speed of the zoom lens 101 is variable, an appropriate zoom start position may be calculated in accordance with the driving speed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-014584, filed on Jan. 26, 2009, which is hereby incorporated by reference herein in its entirety.

What is claimed is:

1. An image sensing apparatus, comprising:
   an image sensing unit that outputs an image signal in accordance with incident light through an optical system including a zoom lens;
   an exposure control unit that controls an exposure of said image sensing unit;
   a zoom photography unit that controls so as to expose said image sensing unit by means of said exposure control unit while driving the zoom lens;
   a storage unit that stores attached information relating to photographing at a predetermined timing after driving of the zoom lens by said zoom photography unit is started, wherein the predetermined timing is an exposure start time of said image sensing unit; and
   a recording unit that records an image signal output from said image sensing unit after ending exposure of said image sensing unit in association with the attached information stored in said storage unit.

2. The image sensing apparatus according to claim 1, wherein the attached information includes exposure information and focal length information.

3. The image sensing apparatus according to claim 1, wherein the storage unit further stores attached information relating to photographing at an exposure end time of said image sensing unit.

4. An image sensing apparatus, comprising:
   an image sensing unit that outputs an image signal in accordance with incident light through an optical system including a zoom lens;
   an exposure control unit that controls an exposure of said image sensing unit;
   a zoom photography unit that controls so as to expose said image sensing unit by means of said exposure control unit while driving the zoom lens;
   a storage unit that stores attached information relating to photographing at a predetermined timing after driving of the zoom lens by said zoom photography unit is started, wherein the predetermined timing is a timing at which a main object is most in focus during exposure of said image sensing unit; and
   a recording unit that records an image signal output from said image sensing unit after ending exposure of said image sensing unit in association with the attached information stored in said storage unit.

5. An image sensing apparatus, comprising:
   an image sensing unit that outputs an image signal in accordance with incident light through an optical system including a zoom lens;
   an exposure control unit that controls an exposure of said image sensing unit;
   a zoom photography unit that controls so as to expose said image sensing unit by means of said exposure control unit while driving the zoom lens;
   a storage unit that stores attached information relating to photographing at a predetermined timing after driving of the zoom lens by said zoom photography unit is started, wherein the predetermined timing is a timing at which a region of a main object in an angle of view is in a range of a predetermined size during exposure of said image sensing unit; and a recording unit that records an image signal output from said image sensing unit after ending exposure of said image sensing unit in association with the attached information stored in said storage unit.

6. An image sensing apparatus, comprising:

an image sensing unit that outputs an image signal in accordance with incident light through an optical system including a zoom lens;

an exposure control unit that controls an exposure of said image sensing unit;

a zoom photography unit that controls so as to expose said image sensing unit by means of said exposure control unit while driving the zoom lens;

a storage unit that stores attached information relating to photographing at a predetermined timing after driving of the zoom lens by said zoom photography unit is started, wherein the predetermined timing is a plurality of times; and a recording unit that records an image signal output from said image sensing unit after ending exposure of said image sensing unit in association with the attached information stored in said storage unit.

7. The image sensing apparatus according to claim 1, further comprising:

a zoom start position storage unit that stores a zoom start position of driving the zoom lens; and an exposure start time storage unit that stores an exposure start time from a start of driving of the zoom lens until a start of exposure of said image sensing unit;

wherein said zoom photography unit starts driving of the zoom lens from the zoom start position stored in said zoom start position storage unit, and after the exposure start time stored in said exposure start time storage unit elapses from the start of driving of the zoom lens, said exposure control unit starts exposure of said image sensing unit.

8. A control method of an image sensing apparatus comprising an image sensing unit that outputs an image signal in accordance with incident light through an optical system including a zoom lens, comprising:

a photographing step of performing photography by exposing said image sensing unit while driving the zoom lens;

a storing step of storing attached information relating to photographing at a predetermined timing after driving of the zoom lens is started in said photographing step, wherein the predetermined timing is an exposure start time of said image sensing unit; and a recording step of recording an image signal output from said image sensing unit after ending exposure of said image sensing unit in association with the attached information that is stored.

9. A non-transitory computer-readable storage medium that stores a program for causing a computer to execute each step of a control method according to claim 8.

10. The image sensing apparatus according to claim 4, wherein the attached information includes exposure information and focal length information.

11. The image sensing apparatus according to claim 5, wherein the attached information includes exposure information and focal length information.

12. The image sensing apparatus according to claim 6, wherein the attached information includes exposure information and focal length information.

13. The image sensing apparatus according to claim 4, further comprising:

a zoom start position storage unit that stores a zoom start position of driving the zoom lens; and an exposure start time storage unit that stores an exposure start time from a start of driving of the zoom lens until a start of exposure of said image sensing unit;

wherein said zoom photography unit starts driving of the zoom lens from the zoom start position stored in said zoom start position storage unit, and after the exposure start time stored in said exposure start time storage unit elapses from the start of driving of the zoom lens, said exposure control unit starts exposure of said image sensing unit.

14. The image sensing apparatus according to claim 5, further comprising:

a zoom start position storage unit that stores a zoom start position of driving the zoom lens; and an exposure start time storage unit that stores an exposure start time from a start of driving of the zoom lens until a start of exposure of said image sensing unit;

wherein said zoom photography unit starts driving of the zoom lens from the zoom start position stored in said zoom start position storage unit, and after the exposure start time stored in said exposure start time storage unit elapses from the start of driving of the zoom lens, said exposure control unit starts exposure of said image sensing unit.

15. The image sensing apparatus according to claim 6, further comprising:

a zoom start position storage unit that stores a zoom start position of driving the zoom lens; and an exposure start time storage unit that stores an exposure start time from a start of driving of the zoom lens until a start of exposure of said image sensing unit;

wherein said zoom photography unit starts driving of the zoom lens from the zoom start position stored in said zoom start position storage unit, and after the exposure start time stored in said exposure start time storage unit elapses from the start of driving of the zoom lens, said exposure control unit starts exposure of said image sensing unit.

16. A control method of an image sensing apparatus comprising an image sensing unit that outputs an image signal in accordance with incident light through an optical system including a zoom lens, comprising:

an exposure control step of controlling an exposure of said image sensing unit;

a photographing step of performing photography by exposing said image sensing unit while driving the zoom lens;

a storing step of storing attached information relating to photographing at a predetermined timing after driving of the zoom lens is started in said photographing step, wherein the predetermined timing is a timing at which a main object is most in focus during exposure of said image sensing unit; and a recording step of recording an image signal output from said image sensing unit after ending exposure of said image sensing unit in association with the attached information that is stored.

17. A control method of an image sensing apparatus comprising an image sensing unit that outputs an image signal in accordance with incident light through an optical system including a zoom lens, comprising:

an exposure control step of controlling an exposure of said image sensing unit;

a photographing step of performing photography by exposing said image sensing unit while driving the zoom lens;

a storing step of storing attached information relating to photographing at a predetermined timing after driving of the zoom lens is started in said photographing step, wherein the predetermined timing is a timing at which a region of a main object in an angle of view is in a range of a predetermined size during exposure of said image sensing unit; and a recording step of recording an image signal output from said image sensing unit after ending exposure of said image sensing unit in association with the attached information that is stored.

18. A control method of an image sensing apparatus comprising an image sensing unit that outputs an image signal in accordance with incident light through an optical system including a zoom lens, comprising:

an exposure control step of controlling an exposure of said image sensing unit;

a photographing step of performing photography by exposing said image sensing unit while driving the zoom lens;

a storing step of storing attached information relating to photographing at a predetermined timing after driving of the zoom lens is started in said photographing step, wherein the predetermined timing is a plurality of times; and a recording step of recording an image signal output from said image sensing unit after ending exposure of said image sensing unit in association with the attached information that is stored.

19. A non-transitory computer-readable storage medium that stores a program for causing a computer to execute each step of a control method according to claim 16.

20. A non-transitory computer-readable storage medium that stores a program for causing a computer to execute each step of a control method according to claim 17.

21. A non-transitory computer-readable storage medium that stores a program for causing a computer to execute each step of a control method according to claim 18.

* * * * *